United States Patent

[11] 3,557,693

| [72] | Inventors | Hermann Kuchenbecker;<br>Wolfgang Fink, Munich; Ludwig Schmidt,<br>Munich, Germany |
|---|---|---|
| [21] | Appl. No. | 762,804 |
| [22] | Filed | Sept. 26, 1968 |
| [45] | Patented | Jan. 26, 1971 |
| [73] | Assignee | Siemens Aktiengesellschaft<br>a corporation of Germany |
| [32] | Priority | Sept. 27, 1967 |
| [33] | | Germany |
| [31] | | 1,549,885 |

[54] TYPE CARRIER FOR PRINTERS AND THE LIKE
9 Claims, 10 Drawing Figs.

[52] U.S. Cl...................................................... 101/93
                                                             101/11
[51] Int. Cl...................................................... B41j 1/20
[50] Field of Search........................................... 101/93RC,
                                                             111, 91, 109

[56] References Cited
UNITED STATES PATENTS

| 3,216,348 | 11/1965 | Oldenburg et al. | 101/93 |
| 3,224,366 | 12/1965 | Cunningham | 101/93 |
| 3,285,164 | 11/1966 | Malavazos | 101/93 |
| 3,379,126 | 4/1968 | Staller et al. | 101/111 |
| 3,399,619 | 9/1968 | Sims | 101/93 |
| 3,435,756 | 4/1969 | Martin | 101/93 |

*Primary Examiner*—William B. Penn
*Attorney*—Hill, Sherman, Meroni, Gross & Simpson ABSTRACT: Type carrier for rapid printers in which the type turns about two parallel spaced direction changing sprockets, one of which is a drive sprocket. The type carriers are guided in end-to-end relation with respect to each other between a pair of parallel spaced guide plates having aligned parallel straight guides therein generally tangential of the direction changing sprockets for guiding the type in a continuous path about the sprockets including a front straight line guide section. The type carriers have type on their front faces and have drive pins extending from one side thereof meshing with the teeth of the direction changing sprockets and movable along guide slots in the straight portions of the guide plates. Guide pins extend from the opposite sides of the type carriers and are guided for movement along straight guide slots in the opposite guide plates, which slots conform to the path of travel of the type carriers. The type carriers are guided for movement along the slots and are retained from outward movement due to centrifugal forces by at least one retainer belt extending along the outsides of the drive pins and the peripheral portions of the teeth of the direction changing sprockets to take up play between the type carriers and the sprockets.

INVENTORS
Hermann Muchenbacker
Wolfgang Fink
Ludwig Schmidt

BY ATTYS.

PATENTED JAN 26 1971 3,557,693

INVENTORS
Hermann Kuchenbacker
Wolfgang Fink
Ludwig Schmidt

BY *[signature]* ATTYS.

TYPE CARRIER FOR PRINTERS AND THE LIKE

BACKGROUND OF THE INVENTION

Heretofore type carriers have been trained about direction changing sprockets and guided for movement in straight line paths between said sprockets in end to end relation with respect to each other. With such type carriers, however, the type carriers are thrown by centrifugal force against the outer guide surfaces when traveling about the sprockets, materially increasing the friction between the type carriers and causing excessive heating and wear thereof.

SUMMARY AND OBJECTS OF THE INVENTION

By our present invention, we overcome these difficulties by utilizing at least one retainer belt extending outwardly of the type carriers and turning about the direction changing sprockets and retaining the type carriers from outward movement relative to the sprockets and assuring that the drive forces extend generally along the pitch circles of the sprockets and thereby retaining the type carriers to their guides and preventing outward movement of the type carriers relative to their sprockets by centrifugal force as traveling thereabout.

A principal object of the present invention is to provide a novel and improved form of type carrier in which play of the type carriers when traveling about their direction changing sprockets is reduced to a minimum by providing at least one retainer belt guided about the sprockets and having retaining engagement with the type carriers, and retaining the type carriers from outward movement relative to the teeth of the sprockets.

A further object of the invention is to improve upon the drive and guides for type carriers heretofore in use by utilizing an endless belt to retain the type carriers in position, particularly when traveling about their drive and idler sprockets.

Still another object of the invention is to provide a novel and improved form of type carrier guided for travel along a continuous path about direction changing idler and drive sprockets, arranged with a view toward reducing the play of the type carriers between each other and relative to the direction changing sprockets of the installation to a minimum.

These and other objects of the invention will appear from time to time as the following specification proceeds and with reference to the accompanying drawings.

DESCRIPTION OF EMBODIMENTS ILLUSTRATED IN THE DRAWINGS

Figure 1:
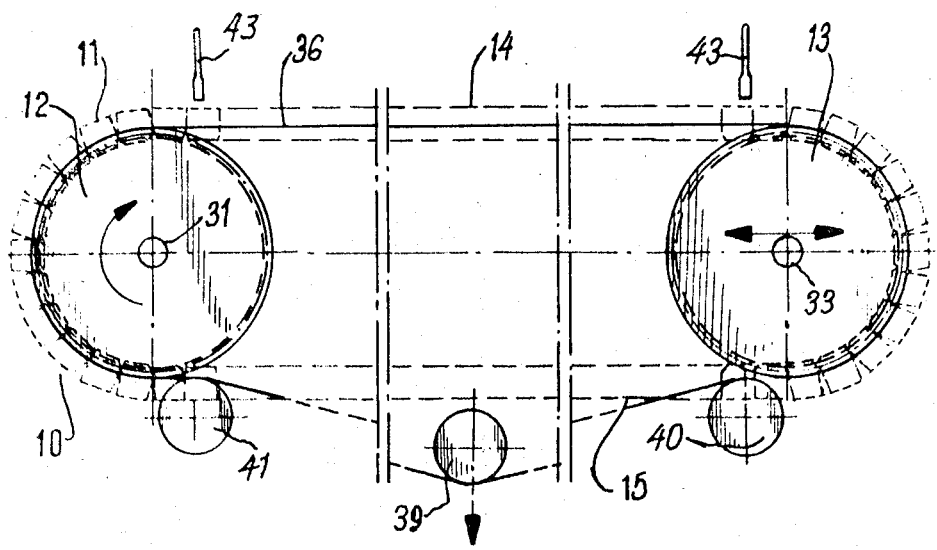
FIG. 1 is a generally diagrammatic plan view of a type carrier installation constructed in accordance with the principles of the present invention.

In the embodiment of the invention illustrated in FIGS. 1 through 5 of the drawings, we have diagrammatically shown a type carrier installation 10, including a plurality of type carriers 11 guided for travel in a continuous path about a drive sprocket 12 and a parallel spaced idler sprocket 13 and traveling in the direction of the arrows in FIG. 1. Between the respective drive and idler sprockets 12 and 13, the type carriers are guided along parallel straight guide track sections 14 and 15, formed between a pair of facing cover plates 16 and 17, spaced apart by a spacer plate 19 extending between the drive and idler sprockets 12 and 13 (FIG. 1).

The spacer plate 19 has a smooth hardened finished front surface forming a rectilinear slidable guide surface 20 for the type carriers 11 and slidably engaged by the rear sides of said type carriers.

The cover plate 16 has a smooth hardened and finished wear surface 21, facing a similar hardened and finished wear surface 22 of the cover plate 17, and slidably engaging opposite sides of the type carriers 11.

Figure 3:
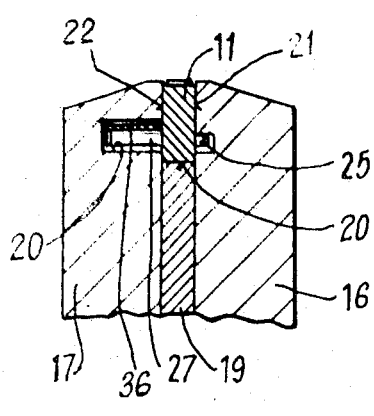
FIG. 3 is a partial fragmentary vertical sectional view taken substantially along line III—III of FIG. 2 and illustrating the type carrier guiding arrangement along a straight guide track section of the track carrier installation.
Figure 4:
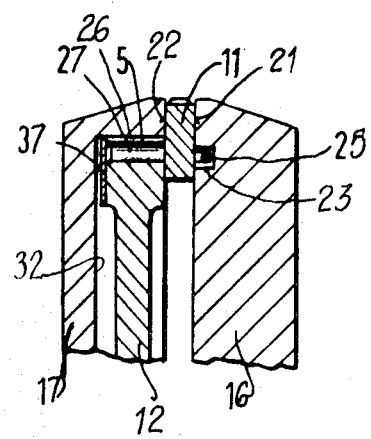
FIG. 4 is a partial fragmentary vertical sectional view, drawn to the same scale as FIG. 3, and taken substantially along line IV—IV of FIG. 2 and illustrating the drive connection between the drive sprocket and type carriers.

The hardened and finished surface 21 has a rectilinear guide slot 23 extending therealong and opening to the type carriers 11. The guide slot 23 is adapted to be engaged by spaced guide pins 25 extending upwardly of the top faces of the type carriers 11 and having beveled outer end portions, as illustrated in FIGS. 3 and 4. The bottom plate 17 has a rectilinear slot 26 extending therealong and opening to the type carriers 11 and receiving drive pins 27 depending from said type carriers.

The rectilinear guides and slots on the back or return run of the type carriers are the same as those on the front or active run so need not be shown or described in detail herein.

Figure 5:
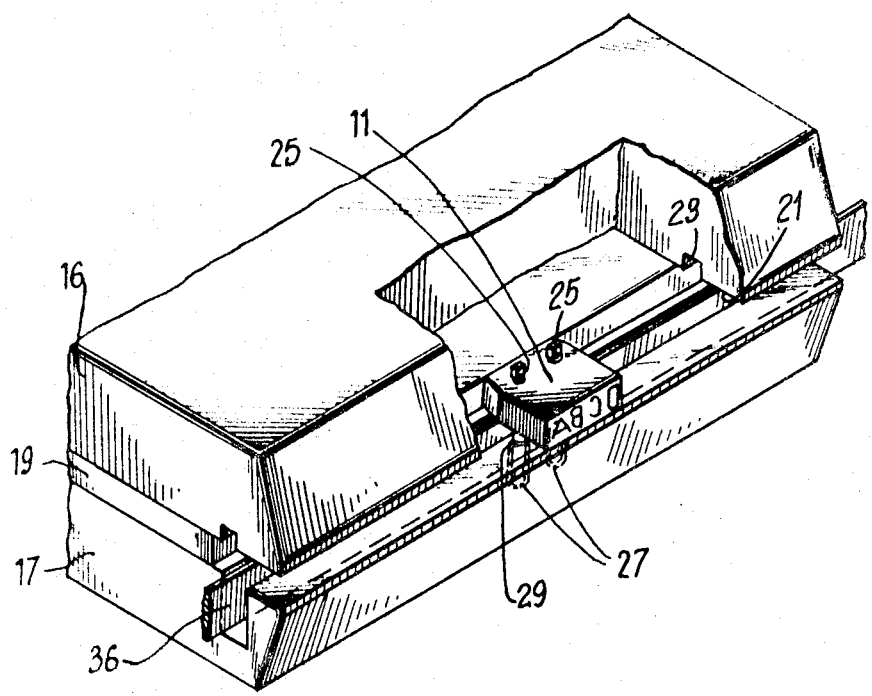
FIG. 5 is a fragmentary generally perspective view of a portion of the type carrier installation shown in FIG. 1, illustrating certain details of the straight track section of the type carrier.
Figure 6:
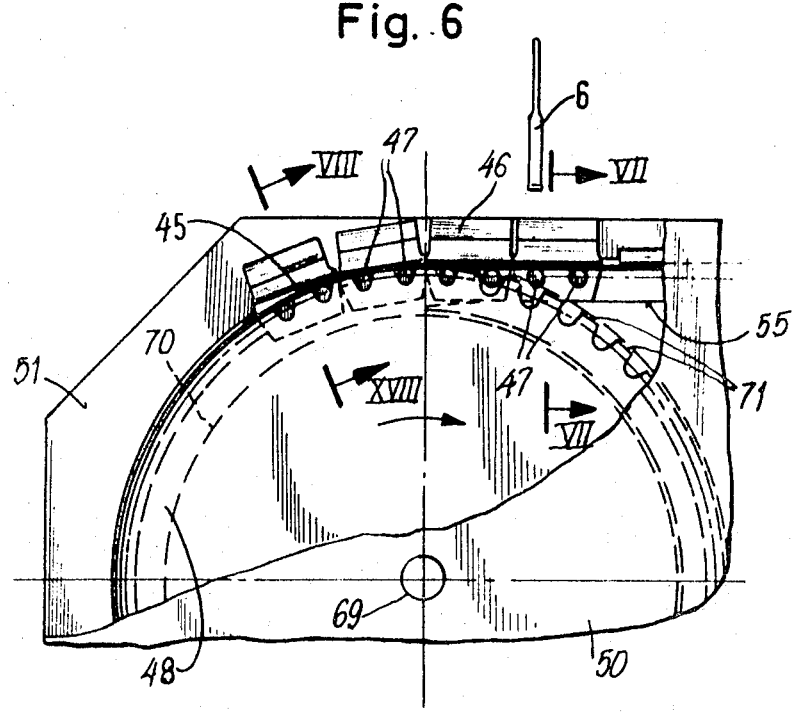
FIG. 6 is a view somewhat similar to FIG. 2, but illustrating a modified form in which the invention may be carried out.

The drive pins 27 may have rollers 29 rotatably mounted thereon as indicated in FIG. 5. As shown in FIG. 5 two guide pins 25 extend upwardly of each type carrier and two drive pins 27 depend from each type carrier and are spaced to mesh between serrations in the form of sprocket teeth 30, 30 of the drive sprocket 12, and between similar teeth of the idler sprocket 13. The number of drive pins depending from each type carrier depends upon the spacing between the teeth of the sprockets 12 and 13 and the length of the type carrier.

The drive sprocket 12 is mounted on a vertical drive shaft 31 suitably journaled in the cover plates 16 and 17, which may be driven in a conventional manner through a suitable motor and speed reducer (not shown). As shown in FIG. 4 the drive sprocket 12 is recessed within a recessed portion 32 of the bottom cover plate 17, generally conforming to the form of said drive sprocket. The space between the sprocket teeth 30 and the interior semicylindrical wall of the recessed portion 32 form a semicircular guide for an endless retainer belt 36. The idler sprocket 13 is freely mounted on a shaft 33 mounted between the plates 16 and 17 and extends within a recessed portion (not shown) in the cover plate 17, similar in form to the recessed portion 32 shown in FIG. 4. The recessed portion in the plate 17 for the idler sprocket 13 in cooperation with the teeth of said idler sprocket likewise forms a semicircular guide for the endless belt 36. The shaft 33 may be adjustable as indicated by the double-headed arrows in FIG. 3.

Referring now in particular to the means for positively retaining the drive pins 27 and rollers 29 in mesh with the idler and drive sprockets as passing thereabout and reducing play of the type carriers to a minimum. The endless flexible retainer belt 36 extends about the outsides of the roller 29 on the drive pins 27 and has sufficient body or rigidity to retain said rollers to the sprocket teeth as passing thereabout. The retainer belt is supported on the outer surfaces of the teeth 30 of the drive and idler sprockets 12 and 13 as turning thereabout, to retain said rollers in mesh in the spaces between the sprocket teeth, and to prevent centrifugal force from throwing said type carriers outwardly relative to said sprocket teeth. The endless retainer belt 36 is shown as abutting the lower faces of the type carriers 11 and as being interposed between said lower faces and an annular retainer 37 forming a flange extending about the lower side of the drive sprocket 12 and outwardly therefrom along the teeth thereof, as shown in FIG. 4. The retainer belt 36 extends about the idler sprocket 13 in a similar manner, and may be retained thereto into engagement with the undersurface of the type carriers by an annular retainer flange (not shown), similar to the annular retainer flange 37.

The retainer belts 36 thus engage the outsides of the rollers 29 on the drive pins 27, during the entire travel of the type carriers along the rectilinear guide sections of the cover plates 16 and 17 and about the drive and idler sprockets, and retain the drive pins and rollers 29 in meshing engagement with the spaces between the sprocket teeth 30.

It should here be understood that the rollers 29 are provided to reduce friction but need not necessarily be used. When referring to rollers, therefore, the term should be construed to mean drive pins with or without rollers.

Figure 7:
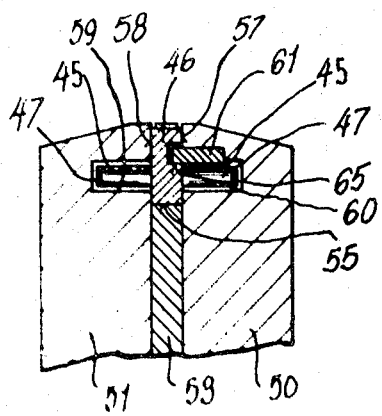
FIG. 7 is a partial fragmentary sectional view taken substantially along line VII—VII of FIG. 6.

A means is provided to take up on the retainer belt 36, which is shown in FIG. 7 as being a tension idler 39 spaced outwardly of the back run of the type carriers and mounted in the cover plates 16 and 17 for adjustable movement inwardly and outwardly of the type carriers. Said tension idler is retained in adjustment by suitable adjusting means, which may be of any conventional form, so need not herein be shown or described in detail. The retainer belt 36 is guided under an idler roller 40 on the outgoing side of the idler sprocket 13. An idler roller 41 at the incoming side of the drive sprocket 12 guides the retainer belt 36 to come into engagement with the rollers 29 and the teeth of the sprocket 12, to pass about said sprocket between the annular retainer flange 37 and bottom faces of the type carriers, to retain the rollers 29 in mesh with the teeth of the sprocket 12 and to thereby reduce the tendency of centrifugal force to throw the type carriers to move outwardly as they travel about said sprocket.

Figure 2:
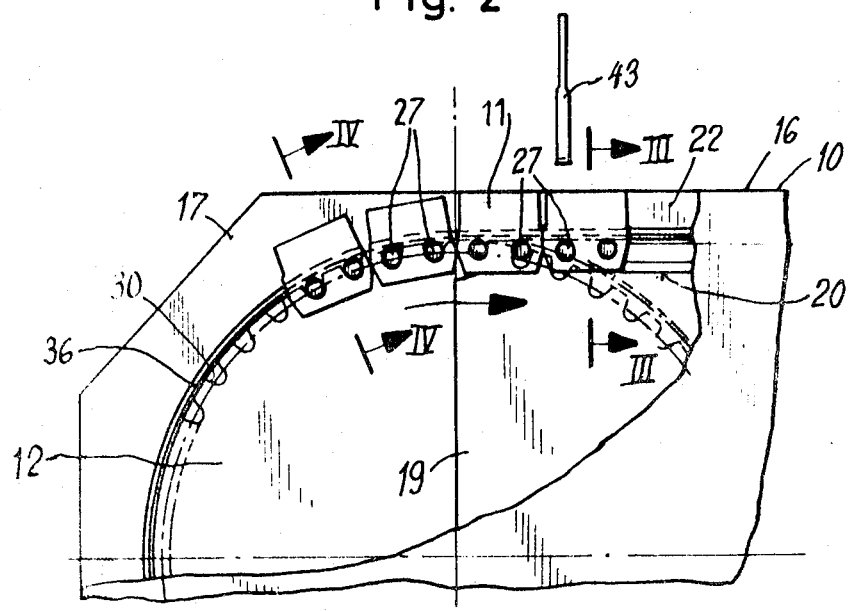
FIG. 2 is an enlarged partial fragmentary view of a portion of the type carrier installation shown in FIG. 1, with the top cover plate broken away to show the drive connections between a direction changing drive sprocket and type carriers.

Pressure hammers 43 of a conventional form are diagrammatically shown in FIGS. 1 and 2. Any number of pressure hammers required may be provided along the front faces of the type carriers. Said hammers operate in a manner which is well known to those skilled in the art and are no part of the present invention so need not herein be shown or described further.

Figure 8:
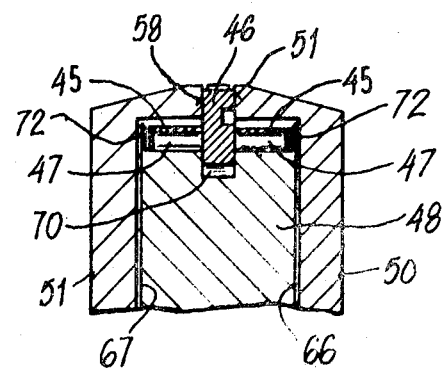
FIG. 8 is a partial fragmentary sectional view taken substantially along line VIII—VIII of FIG. 6.
Figure 9:
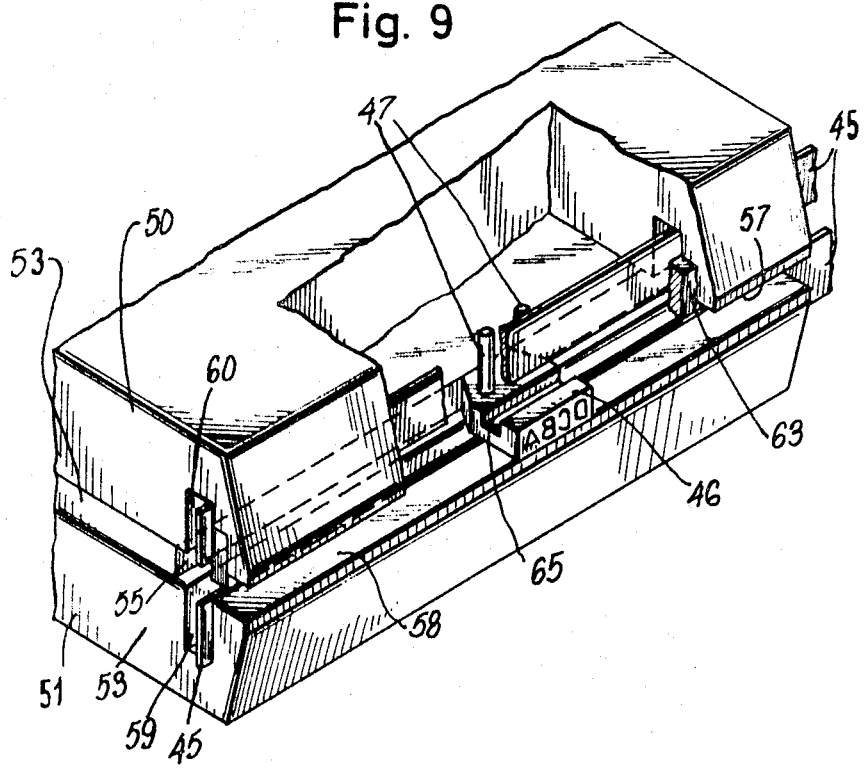
FIG. 9 is a partial perspective view of a portion of a type carrier installation illustrating certain details of the straight track section of the track utilized in the modified form of the invention illustrated in FIGS. 6, 7 and 8.

In FIGS. 6, 7, 8 and 9, we have shown a modified form in which the invention may be embodied, in which endless retainer belts 45 extend along opposite sides of the type carriers 46 and have engagement with drive pins 47 extending upwardly and downwardly of the type carriers to retain the drive pins 47 to the teeth of a drive sprocket 48 and a similar idler sprocket (not shown). The type carriers are guided for movement along rectilinear guide tracks between the sprockets, which are formed between cover plates 50 and 51 spaced apart by a spacer plate 53. Outer faces 55 of the spacer plate 53 are smoothed and hardened to form rectilinear sliding faces for the type carriers 46. The type carriers also slide between finished faces 57 and 58 of the respective cover plates 50 and 51. As shown in FIGS. 7 and 9, the bottom cover plate 51 has a slot 59 opening through the face 58 and extending therealong and receiving a retainer belt 45 and drive pins 47. The upper cover plate 50 has a similar slot 60 therein registering with the slot 59 and accommodating the guide pins 47 and associated retainer belt 45 to move therealong between the drive sprocket 48 and an associated parallel spaced direction changing idler sprocket (not shown), as in the form of the invention illustrated in FIGS. 1 to 5. The slot 60 has a right angled recess 61 formed in the forward portion of its top face, having a retainer bar 63 mounted therein and extending therealong for engagement with upwardly opening slots 65 formed in the type carriers 46, to guide said type carriers for travel in rectilinear paths between the drive sprocket 48 and the spaced idler sprocket (not shown).

The drive sprocket 48 is mounted between the cover plates 50 and 51 in recessed portions 66 and 67, formed in the end portions of the respective cover plates (FIG. 8). A vertical shaft 69 forms a mounting and drive member for the drive sprocket 48. The drive sprocket 48, as shown in FIG. 8, has an outwardly opening circumferential slot 70 formed therein midway between opposite sides of the face of the sprocket for receiving the type carriers 46. Sprocket teeth 71 extend along opposite sides of the slot 70 and the type carriers 46, and are engaged by the retainer belts 45, along the periphery of said sprocket teeth. Said retainer belts thus retain the drive pins 47 from centrifugal outward movement and in mesh in the spaces between said sprocket teeth. Radial flanges 72 extend along the outsides of the sprocket teeth 71 (FIG. 8).

The retainer belts 45 thus hold the type carriers 46 from centrifugal outward movement relative to the sprocket teeth 71, and retain the type carriers to the rectilinear guide surfaces 55 of the spacer 53 as in the form of the invention illustrated in FIGS. 1 to 5 inclusive. Suitable take up means may be provided for the retainer belts 45 which may be like the take up means illustrated in FIG. 1 or which may be of any other well known form.

Figure 10:
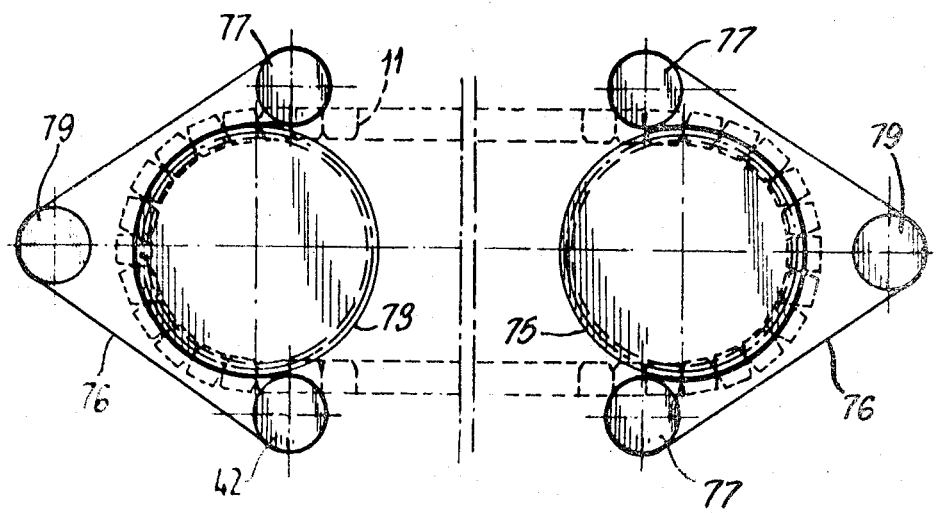
FIG. 10 is a diagrammatic plan view illustrating still another form in which the type carrier of the present invention may be embodied.

In the form of the invention illustrated in FIG. 10, we have shown still another modification of arrangement of the retainer belts. In this form of the invention, the type carriers and the guide means for the type carriers may be of the same form as in the form of our invention illustrated in FIGS. 1 to 5 or in FIGS. 6 to 9. The type carriers may also be guided in the same manner to turn about a drive direction changing sprocket 73 and an idler direction changing sprocket 75.

Individual endless retainer belts 76 are provided for each drive and idler sprocket and are wrapped about said sprockets for 180° by wrapping idlers 77,77. Said wrapping idlers, 77,77 are spaced at opposite sides of said sprockets 72 and 73 along straight portions 79 of the guide tracks, and wrap the retainer belts 76 about said sprockets to release the drive pins (not shown) of the type carriers to move along the respective rectilinear guide tracks 79 as the type carriers pass by the outgoing sides of said sprockets, and to guide the type carriers to said sprockets at the incoming sides of said sprockets, to effect continuous movement of the type carriers in one direction or another depending upon the direction of rotation of the drive sprocket 73. The retainer belts 76 thereby reduce play between the type carriers and between the drive pins and teeth of the drive and idler sprockets during travel of the type carriers thereabout. Idlers 79 cooperate with the idlers 77 to wrap the retainer belts about the sprockets 73 and 75 and to maintain the retainer belts under tension. The idlers 79 may be mounted for adjustable movement toward and from the respective sprockets, and thus maintain the retainer belts 76 at the required tension.

It may be seen from the foregoing that an improved form of type carrier installation has been provided in which flexible retainer belts traveling about the drive and idler direction changing sprockets of the installation maintain the drive pins of the type carriers in mesh with the teeth of the sprockets, which are sufficiently firm to prevent centrifugal force from forcing the type carriers outwardly of the sprocket teeth. The type carriers thus may readily be successively pushed along the straight track sections tangentially of the pitch lines of the sprocket teeth and all radially outward forces on the type carriers as passing about the sprockets are eliminated, resulting in a material reduction in friction and accurate positioning of the type carriers and ready reversal of the direction of travel thereof, with a minimum of friction.

While we have herein shown and described several forms in which the invention may be embodied, it may readily be understood that various other variations and modifications in the invention may be attained without departing from the spirit and scope of the novel concepts of the invention.

We claim:

1. In a type carrier installation particularly adapted for rapid printers:
    a frame;

a series of type carriers in mutual engagement with each other guided in said frame for movement in a plane perpendicular to the plane of movement of the printing hammers;

a drive sprocket rotatably mounted in said frame;

an idler sprocket spaced from said drive sprocket, said drive and idler sprockets having uniformly spaced sprocket teeth;

two parallel rectilinear guides connecting said drive sprocket with said idler sprocket along the incoming and outgoing sides thereof and generally tangentially of the bases of said sprocket teeth;

semicircular guides extending partially about said drive sprocket and said idler sprocket and connecting the incoming ends of the rectilinear guides with the outgoing ends thereof;

spaced drive pins extending laterally from each of said type carriers for engagement with the teeth of said drive and idler sprockets; and at least one endless belt engaging the outer sides of said drive pins of said type carriers and supporting the type carriers to the outsides of the peripheries of the sprockets and maintaining said drive pins in engagement with the teeth of said sprockets and in engagement with each other along engagement lines running in a thrust direction.

2. The type carrier installation of claim 1, wherein annular flanges extend about said sprockets, along one side thereof in registry with and extending radially outwardly of the teeth of said sprockets, and wherein said retainer belts are interposed between said type carriers and said annular flanges.

3. The type carrier installation of claim 1, wherein the rectilinear guides comprise front and back guides, wherein pressure hammers face said front guides, and wherein at least one tension idler has tensioning engagement with said retainer belt in outwardly spaced relation with respect to the back guide.

4. The type carrier installation of claim 3, wherein idlers are provided on opposite sides of said tension idler at the outgoing side of one sprocket and the incoming side of the next sprocket and have guiding engagement with the outer sides of said retainer belt to guide said belt as passing from the outgoing side of one sprocket to said tension idler and from said tension idler to the incoming side of the other sprocket.

5. A type carrier installation in accordance with claim 2, wherein said drive pins have rollers rotatably mounted thereon engageable in the spaces between said sprocket teeth.

6. A type carrier installation in accordance with claim 1, wherein drive pins extend from opposite sides of said type carriers, and are spaces apart to mesh in the space between the teeth of said sprockets, and wherein retainer belts extend along opposite sides of said type carriers into engagement with said drive pins to retain said type carriers from radial outward play with respect to said sprockets.

7. A type carrier installation in accordance with claim 6, wherein said drive and idler sprockets each have an outwardly opening circumferential recess therein intermediate the sides thereof, and wherein the type carriers move into said recess and accommodate said retainer belts to position and retain said drive pins in engagement with said sprocket teeth on opposite sides of said recess.

8. A type carrier installation in accordance with claim 1, wherein individual retainer belts are provided for each sprocket, and wherein means are provided wrapping said retainer belts about said sprockets to retain said drive pins to said sprockets for at least 180°.

9. A type carrier installation in accordance with claim 8, wherein the means wrapping said retainer belts about said sprockets comprise wrapping idlers disposed adjacent the incoming and outgoing sides of said sprockets, and tension idlers spaced outwardly of said sprockets and between said wrapping idlers.